C. H. NEWTON.
VALVE SPRING COMPRESSOR.
APPLICATION FILED NOV. 1, 1919.
1,346,416.
Patented July 13, 1920.
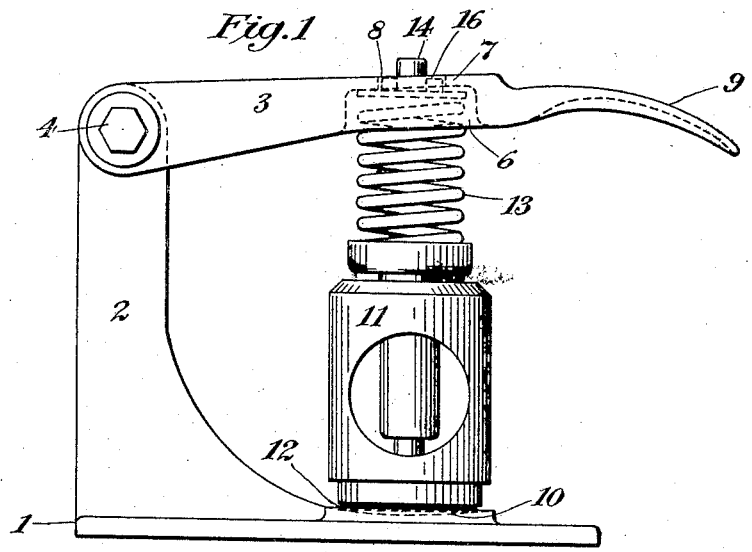
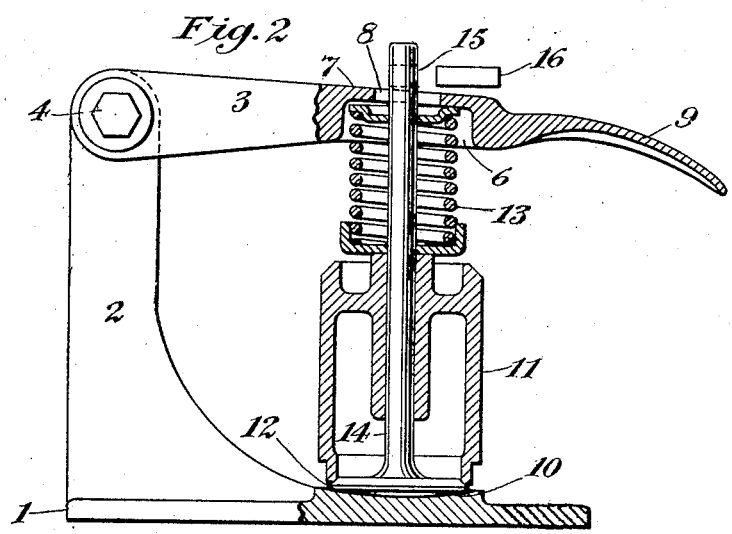
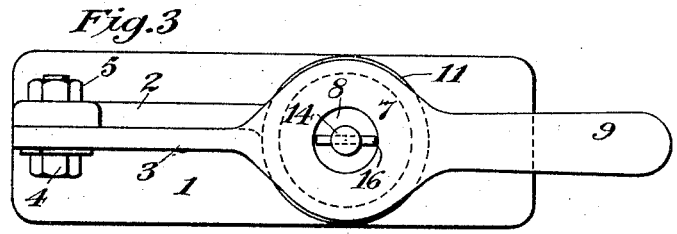
INVENTOR
Charles H. Newton.
BY
Andrew Wilson.
ATTORNEY

UNITED STATES PATENT OFFICE.

CHARLES H. NEWTON, OF PLAINVILLE, CONNECTICUT.

VALVE-SPRING COMPRESSOR.

1,346,416.   Specification of Letters Patent.   Patented July 13, 1920.

Application filed November 1, 1919. Serial No. 335,038.

*To all whom it may concern:*

Be it known that I, CHARLES H. NEWTON, a citizen of the United States, and resident of Plainville, in the county of Hartford and State of Connecticut, have invented certain new and useful Improvements in Valve-Spring Compressors, of which the following is a specification.

My invention relates to means for readily and effectively compressing the springs of valves of internal combustion engines so as to permit the assembling and disassembling of the valve unit embodying the spring and valve stem, and my improvements are particularly applicable for use in connection with the type of spring-controlled valves which are embodied in Buick automobile engines and similar mechanisms; and I have illustrated the application of my improved device in connection with a valve unit of a Buick automobile engine.

In the drawings Figure 1 is a side elevation of my improved valve spring compressor showing it in position to compress the spring of a valve unit; Fig. 2 is a similar view showing the spring compressed, parts of the compressor and the valve unit being shown in section; and Fig. 3 is a plan view of Fig. 1.

In all the figures, the same parts are designated by corresponding reference numerals.

My improved valve spring compressor embodies a base 1, a standard 2, and a lever 3 which is pivoted to the standard by a bolt 4 secured by a suitable retaining device, as a nut 5.

The base 1 is provided with a portion having a suitable configuration to receive and support the lower end of the valve unit. In the illustration this portion is shown as consisting of a raised, disk-like element having a concaved upper face 10, which will afford a suitable bearing for the valve head 12 and will permit of its ready adjustment so as to center the valve-stem 14 and spring 13 in a proper vertical position.

The lever 3 is provided in its lower side with a concavity or socket 6, and an aperture 8 opening entirely through the lever and surrounded by a flange-like rim 7; and the free end of the lever 3 is extended into a suitable handle 9.

The socket 6 is placed directly above the concavity 10 in the base element; so that when a valve unit is placed upon the base the upper end of its valve stem will center below and pass up through the hole 8 in the lever 3, and the concave washer above the valve spring will be engaged by the under side of the rim 7. The hole 8 is sufficiently large to permit the key 16 which slips through the key seat 15 in the valve stem 14, and, normally, lies in the concavity of the valve spring washer, to pass up through the hole 8 when the valve spring is compressed.

It will be seen, therefore, that when the valve unit, which in the illustration is shown as embodying the valve cage 11, stem 14, head 12, spring 13 with its washer, and key 16, is placed in the position shown in Fig. 1, and the lever 3 is forced down, the spring washer will be depressed, compressing the spring 13 and allowing the valve stem to protrude through the hole 8, as shown in Fig. 2, so that its key 16 will be above the lever 3 and may be withdrawn as shown in Fig. 2.

On raising the lever 3 the elements of the valve unit may then be disassembled. Conversely, if the valve stem, cage, spring and washer are arranged in their proper relative positions and placed in the compressor, the spring may be readily compressed so as to permit the placing of the key 16 in its seat so as to lock the elements of the valve unit together.

My device is simple in construction, and efficient in use, and supplies the motorist with convenient means for separating the elements of a valve unit, so as to make repairs or replacements without the help of skilled mechanics or the use of general means not specially designed for the purpose and hence not working as efficiently or simply as will my device.

Having thus described my invention, what I claim and desire to secure by Letters Patent of the United States is:—

In a spring compressor for Buick valve units, the combination of a base provided with a circular, concaved seat adapted to coöperatively receive the lower end of a valve unit, a lever support integral with the base, a lever pivoted to the support at substantially the height of such valve unit, such lever being provided with an integral enlargement having a circular socket in the lower side thereof centered above the concave base and adapted to receive the spring washer of such valve unit, a circular opening through the top of said socket adapted to permit the passage therethrough of the valve stem and key, and an extended handle integral with said lever for applying downward pressure thereto.

CHARLES H. NEWTON.